(12) United States Patent
Wang et al.

(10) Patent No.: US 11,709,557 B1
(45) Date of Patent: Jul. 25, 2023

(54) MULTIPURPOSE CONTROLLER DEVICE

(71) Applicant: Apple Inc., Cupertino, CA (US)

(72) Inventors: Paul X. Wang, Cupertino, CA (US); Ryan P. Brooks, Menlo Park, CA (US); Pol Pla I Conesa, Belmont, CA (US)

(73) Assignee: APPLE INC., Cupertino, CA (US)

( * ) Notice: Subject to any disclaimer, the term of this patent is extended or adjusted under 35 U.S.C. 154(b) by 143 days.

(21) Appl. No.: 16/994,480

(22) Filed: Aug. 14, 2020

Related U.S. Application Data

(60) Provisional application No. 62/906,009, filed on Sep. 25, 2019.

(51) Int. Cl.
*A63F 9/24* (2006.01)
*G06F 3/041* (2006.01)
*G06F 3/02* (2006.01)

(52) U.S. Cl.
CPC ............ *G06F 3/041* (2013.01); *G06F 3/0202* (2013.01)

(58) Field of Classification Search
None
See application file for complete search history.

(56) References Cited

U.S. PATENT DOCUMENTS

| | | | |
|---|---|---|---|
| 7,377,851 B2 * | 5/2008 | Goto | G05G 9/047 463/37 |
| 7,868,870 B2 * | 1/2011 | Ito | G05G 1/02 345/169 |
| 10,042,599 B2 | 8/2018 | Wood, Jr. et al. | |
| 10,073,592 B2 | 9/2018 | Penha et al. | |
| 10,120,531 B2 | 11/2018 | Lochhead et al. | |
| 10,152,300 B2 | 12/2018 | Brown et al. | |
| 10,209,866 B2 | 2/2019 | Johnston et al. | |
| 10,338,781 B2 | 7/2019 | Chaudhri et al. | |
| 10,348,108 B2 | 7/2019 | Hodges et al. | |
| 2005/0176506 A1 * | 8/2005 | Goto | A63F 13/28 463/37 |
| 2011/0105231 A1 * | 5/2011 | Ambinder | A63F 13/24 463/38 |
| 2013/0178293 A1 | 7/2013 | Nakayama et al. | |
| 2019/0172341 A1 | 6/2019 | Bataillou et al. | |

* cited by examiner

*Primary Examiner* — Carl Adams
(74) *Attorney, Agent, or Firm* — BakerHostetler

(57) ABSTRACT

Controller devices can provide a user with multiple modes of operation. For example, the user can hold and operate the controller device in a first orientation for control of a first device and/or first mode of a device (e.g., media player), and the user can hold and operate the controller device in a second orientation for control of a second device and/or second mode of a device (e.g., gaming device). Features can be selectively stowed and deployed to facilitate user operation in the different modes. By further example, a controller device can be separated into segments to allow multiple users to hold and provide inputs with corresponding segments.

20 Claims, 10 Drawing Sheets

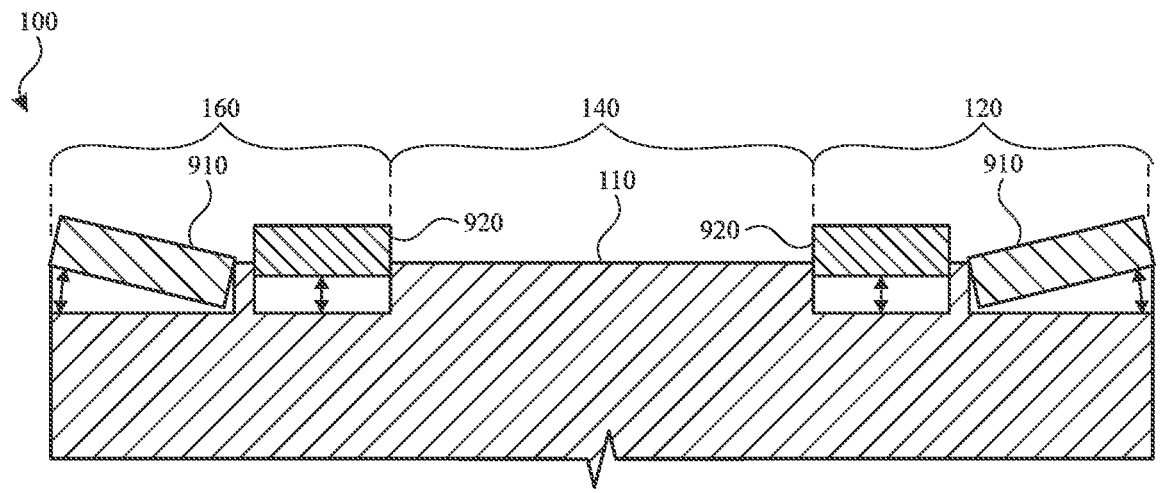
FIG. 10
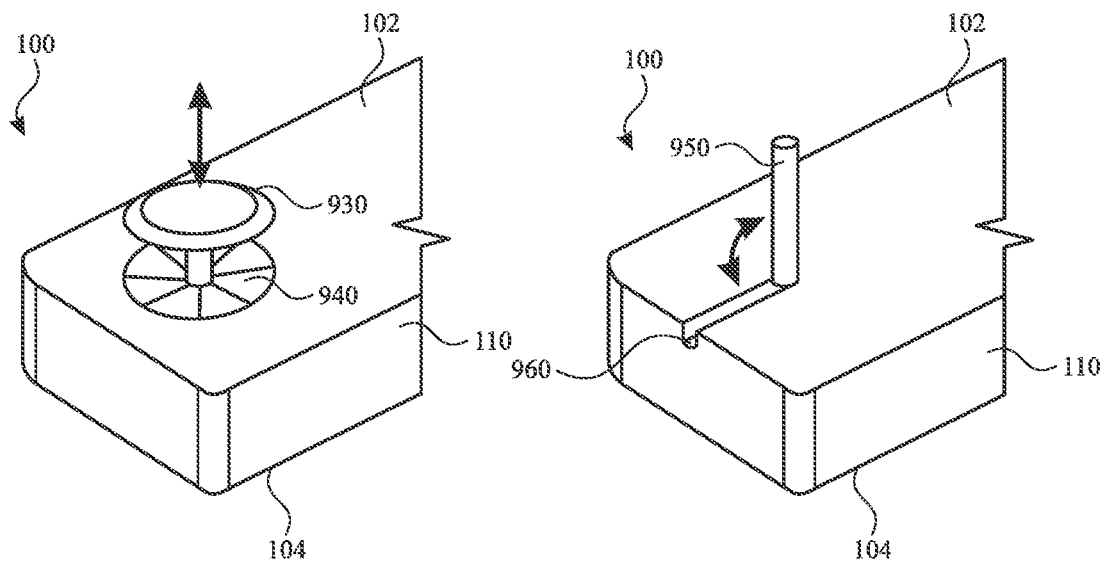
FIG. 11
FIG. 12

MULTIPURPOSE CONTROLLER DEVICE

CROSS-REFERENCE TO RELATED APPLICATION

This application claims the benefit of U.S. Provisional Application No. 62/906,009, entitled "MULTIPURPOSE CONTROLLER DEVICE," filed Sep. 25, 2019, the entirety of which is incorporated herein by reference.

TECHNICAL FIELD

The present description relates generally to input devices, and, more particularly, to a controller device that provides multiple functions for a user to use in a variety of contexts.

BACKGROUND

Controller devices are used to control various electronic devices such as televisions, DVD players, stereos, and game consoles. Typically, the controller device includes multiple buttons that can be pressed by a user to interact with the electronic device or to interact with a program or application displayed on the electronic device itself or on a second electronic device connected to the electronic device. The inputs provided by the user via the controller device can be communicated to the electronic device for execution of an action that corresponds to the input provided.

BRIEF DESCRIPTION OF THE DRAWINGS

Certain features of the subject technology are set forth in the appended claims.

However, for purpose of explanation, several embodiments of the subject technology are set forth in the following figures.

FIG. 10 illustrates a sectional view of a controller device, in accordance with some embodiments of the present disclosure.

FIG. 11 illustrates a perspective view of a portion of a controller device, in accordance with some embodiments of the present disclosure.

FIG. 12 illustrates a perspective view of a portion of a controller device, in accordance with some embodiments of the present disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Embodiments described herein provide a controller device that can be used with networked devices, such as computers, tablet computing devices, video streaming media player devices, and/or gaming devices. The controller device includes a base element having surfaces for a user to operate and provide inputs. The inputs can include touch and/or force input. One or more force sensing switches can be positioned in a housing of the controller device and provide a signal based on the presence and/or amount of an applied force. For example, a base element of the controller device can include one or more buttons. The buttons can provide for a variety of user inputs, such as volume control, channel control, a home button, a select button, navigation buttons, pause or play buttons, and a device or mode button. The same or different buttons can also be used to provide other user inputs, such as directional controls and/or action controls that correspond to activities that are to be performed within a game or other program of the electronic device receiving commands based on the inputs.

Controller devices described herein can provide a user with multiple modes of operation. For example, the user can hold and operate the controller device in a first orientation for control of a first device and/or first mode of a device (e.g., media player), and the user can hold and operate the controller device in a second orientation for control of a second device and/or second mode of a device (e.g., gaming device). Features can be selectively stowed and deployed to facilitate user operation in the different modes. By further example, a controller device can be separated into segments to allow multiple users to hold and provide inputs with corresponding segments.

These and other embodiments are discussed below with reference to FIGS. 1-11. However, those skilled in the art will readily appreciate that the detailed description given herein with respect to these Figures is for explanatory purposes only and should not be construed as limiting.

Figure 1:
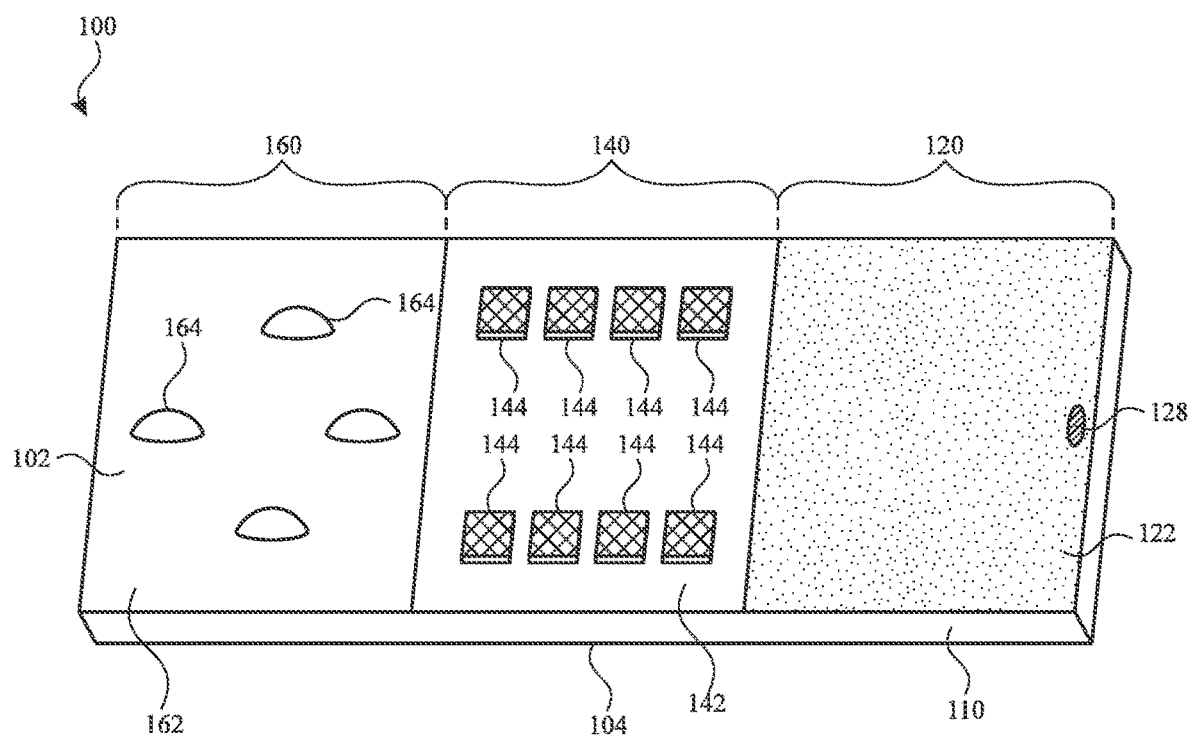
FIG. 1 illustrates a perspective view of a controller device, in accordance with some embodiments of the present disclosure.

Referring now to FIG. 1, there is shown a perspective view of a controller device that can include one or more input elements. The controller device 100 includes a housing 110 on a rear side 104 and one or more input regions on a front side 102. The input regions can be distributed along the front side 102. For example, as shown in FIG. 1, the front side 102 can included a top input region 120, a middle input region 140, and a bottom input region 160.

One or more of the input regions can be at least partially defined by one or more base elements, such as a top base element 122 (e.g., a top base element), a middle base element 142 (e.g., a middle base element), and/or a bottom base element 162 (e.g., a bottom base element). The base elements can provide, contain, and/or support input elements for receiving inputs by a user. Corresponding detection mechanisms can be provided to detect the inputs and transmit appropriate commands, as described further herein.

One or more of the base elements can be of or include, for example, glass, plastic, metal, and/or combinations thereof. A continuous base element can extend across multiple input regions. As shown in FIG. 1, the top base element 122 and the middle base element 142 can define a continuous (e.g., monolithic, integral, etc.) base element that extends across at least portions of both the top input region 120 and the middle input region 140. The bottom base element 162 can be a separate base element or alternatively a portion of the same continuous base element as defined by the top base element 122 and the middle base element 142.

A front surface of the top base element 122 can form a textured, frictionally engaging surface that is optionally different than a front surface of the middle base element 142. The top base element 122 and the middle base element 142 can have substantially the same or different dimensions. The front surface of the middle base element 142 can be smooth or include some texturing or covering.

Additionally or alternatively, the top base element 122 can define an input feature that facilitates tactile and/or visual identification by a user. Additionally or alternatively, the top base element 122 can define openings (not shown) that can extend through the top base element 122 to provide for one or more buttons (not shown). For example, the top base element 122 can define a feature that is recessed and/or protruding with respect to other portions of the front surface of the top base element 122. By further example, the top base element 122 can define a feature that has a textured, concave, and/or convex surface. Features can be formed in or adjacent to surfaces thereof and/or illuminated to aid a user in identifying an input feature and its function. As such, the front surface of the top base element 122 can be used for user inputs, such as a touch input and/or a force input.

As used herein, a touch input is an input that is detected based on contact between two items (e.g., a user's finger and a surface of a base element). Such a detection can be directly or indirectly detected (e.g., inferred from a detection other than contact, such as proximity). For example, a user's finger can move or slide over the surface of a base element to provide inputs based on the position(s) of the contact. The user's finger can move more easily on or over the textured surface because the finger contacts a lesser amount of surface compared to a smooth surface.

As used herein, a force input is an input that is detected based on a force applied to an item (e.g., a force of a user's finger pressing on the surface of a base element). Such a detection can be directly or indirectly detected (e.g., inferred from movement in response to a force). For example, the user can apply a force that tends to displace, deflect, and/or deform a base element.

The top base element 122 and/or another base element (e.g., middle base element 142 and/or the bottom base element 162) can include one or more openings 128 for a microphone or one or more speakers. Additionally or alternatively, the housing 110 can include an opening or openings (not shown) for a microphone or one or more speakers. The microphone can be operated to receive speech input and/or voice recognition from the user.

Openings (not shown) can extend through the middle base element 142 and/or another base element (e.g., top base element 122 and/or the bottom base element 162) to provide for one or more buttons 144. The buttons can provide for a variety of user inputs, such as volume control, channel control, a home button, a select button, navigation buttons, pause or play buttons, and a device or mode button. The buttons 144 can be formed with any suitable material, including metal or plastic. The buttons can be flush with the surface, be recessed with respect to the surface, protrude or extend beyond the surface, and/or a combination of these configurations. For example, in some embodiments, some of the buttons 144 are flush while other buttons 144 protrude. Additionally or alternatively, the buttons 144 can have any given shape and/or surface. For example, a button 144 can have a textured, concave, and/or convex surface while another button 144 has a smooth or flat surface. The buttons 144 can be shaped differently to assist a user in identifying the buttons 144 from one another. Raised symbols can be formed in surfaces thereof and/or an area around the buttons 144. The buttons 144 and/or an area around the buttons 144 can be illuminated to aid a user in identifying a button 144 and its function.

A front surface of the top base element 122 can form a textured, frictionally engaging surface that is optionally different than the front surface of the middle base element 142. The front surface of the bottom base element 162 can be smooth and/or include some texturing or covering.

The bottom base element 162 can define an input feature that facilitates tactile and/or visual identification by a user. For example, the bottom base element 162 can define and/or support input features 164 that are protruding and/or recessed with respect to other portions of the front surface of the bottom base element 162. By further example, the bottom base element 162 can define input features 164 feature that has a textured, concave, and/or convex surface. Raised symbols can be formed in surfaces of the input features 164 and/or an area around the input features 164. The input features 164 and/or an area around the input features 164 can be illuminated to aid a user in identifying an input features 164 and its function. The input features 164 of the bottom base element 162 can be used for user inputs, such as a force input and/or a touch input.

Additionally or alternatively, the bottom base element 162 can define openings (not shown) that can extend through the bottom base element 162 to provide for one or more input features 164 that move at least partially through and with respect to the bottom base element 162.

The input features 164 can be arranged and programmed to receive user input that indicates a directional command. For example, four input features 164 can be provided to represent directional commands to be executed by a program on an external device. Each of the directional commands can correspond to a direction shown on a display of the external device. While four input features 164 are illustrated, it will be understood that any number of input features 164 can be provided.

It will be understood that additional or fewer input regions can be provided and that the input regions can be provided in any arrangement. For example, the top input region 120, the middle input region 140, and/or the bottom input region 160 can be arranged in any sequence moving in a direction across the front side 102. By further example, the top input region 120, the middle input region 140, and/or the bottom input region 160 can be arranged at different locations along the front side 102 than those illustrated.

The housing 110 is formed such that an interior cavity (not shown) is disposed between the lower surface and the sidewalls of the housing 110. The interior cavity can include various structural, electrical and/or mechanical components. The housing 110 can be made of any suitable material or materials, such as a metal, a plastic, glass, and/or combinations thereof.

Figure 2:
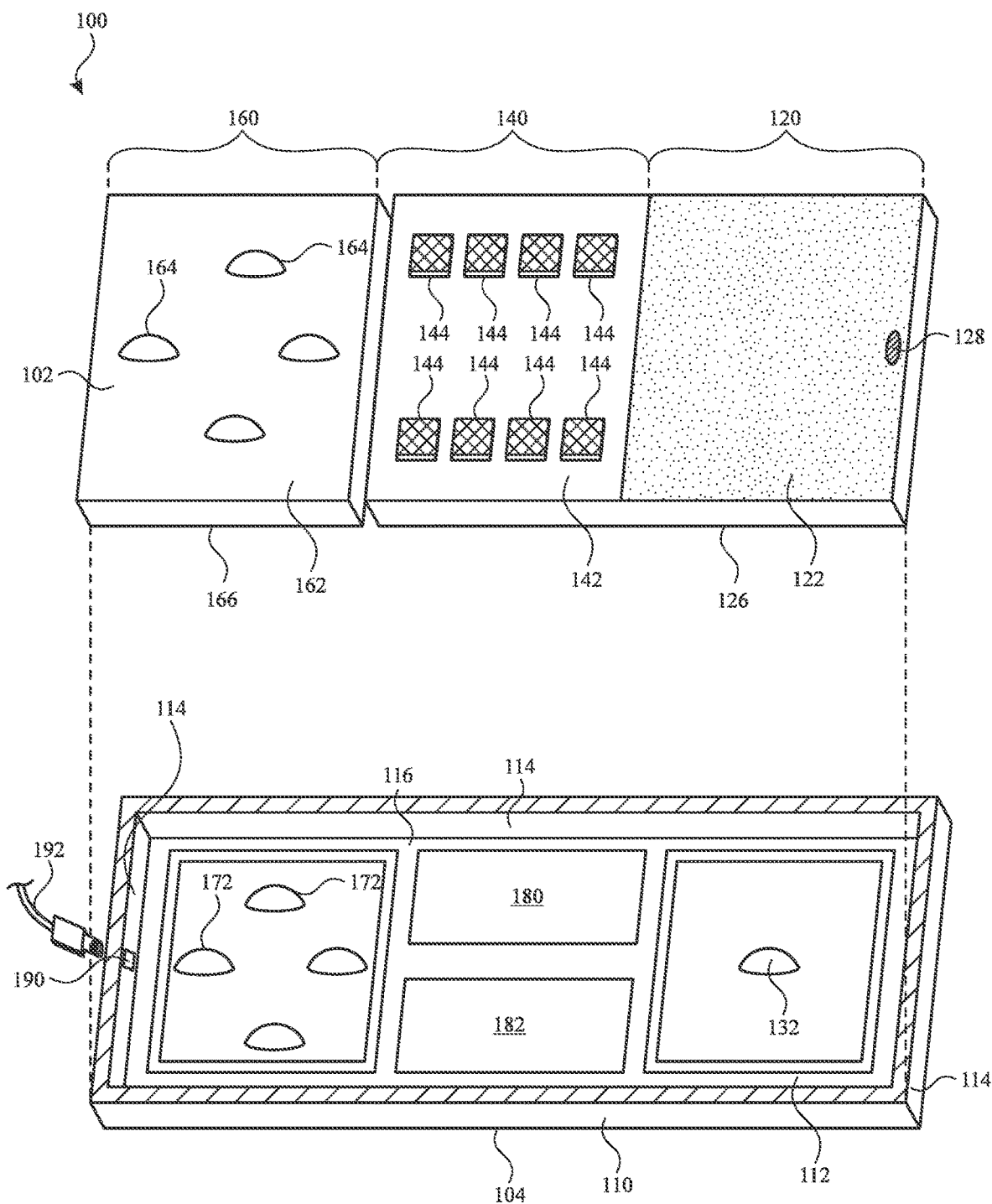
FIG. 2 illustrates an exploded perspective view of a controller device, in accordance with some embodiments of the present disclosure.

Referring now to FIG. 2, a view is provided of the controller device 100 of FIG. 1 with the input regions 120, 140, and 160 detached from the housing 110. The housing 110 is formed such that an interior cavity 116 is disposed between the lower surface 112 and the sidewalls 114 of the housing 110. The interior cavity 116 can include various structural, electrical and/or mechanical components. For example, the interior cavity 116 can include a power source such as one or more batteries or rechargeable batteries 182 and a main logic board 180. The main logic board 180 can include various integrated circuits in addition to one or more processing devices. For example, the main logic board 180 can include a data storage device, one or more microphones, and other support circuits. One or more wireless communication devices such as an infrared, Bluetooth®, WiFi, or RF device can be included in the interior cavity 116.

A connector port 190 at the housing 110 can receive an electrical cord or cable 192 that connects the controller device 100 to a power source, such as a wall outlet, to charge a rechargeable battery 182. Additionally or alternatively, the controller device 100 can be connected to a charging dock to recharge the battery 182. Additionally or alternatively, the controller device 100 can be connected to another device via the connector port 190 to provide power to the other device. Additionally or alternatively, the controller device 100 can communicate with another device via the connector port 190.

The sidewalls 114 can provide and/or support a trim that extends or protrudes out along the interior edges of the sidewalls 114. In some embodiments, a portion of the underside of the top base element 122, the middle base element 142, and/or the bottom base element 162 can be connected to the trim. For example, the rear surface of the middle base element 142 can be connected to the housing 110. For example, an adhesive can be used to affix the middle base element 142 to the trim. In other embodiments, the underside of a base element can be affixed to the housing 110 in other configurations, such as at the top base element 122 and/or the bottom base element 162.

The underside of the top base element 122 may optionally be not connected to the trim of the housing 110. This allows the top base element 122 to bend when a force is applied to the front surface thereof. Since the middle base element 142 can be affixed to the housing 110, the top base element 122 does not pivot but rather bends at or near the interface between the non-affixed top base element 122 and the affixed middle base element 142. The type of glass or materials used in the base element(s) may limit the bending range such that when a user presses down on the top base element 122, the user may not detect any movement thereof.

A force sensor 132 can be disposed on the lower surface 112 of the housing 110 below the top base element 122. Additionally or alternatively, a force sensor can be provided on the top base element 122 (e.g., on a rear or interior-facing side). Examples of a force sensor 132 can include strain gauges, dome switches, piezoelectric sensors, optical encoders, proximity sensors, capacitive sensor, and combinations thereof. A force sensor 132 can be operated independently and/or with multiple components that operate in concert with each other to provide an output that indicated an amount and/or presence of a force that is detected. In some embodiments, multiple components operate in concert to detect a force. For example, when a force is applied to the top base element 122, such as when a finger presses down on the surface, the top base element 122 bends and a force-sensing switch of the force sensor 132 senses the strain in a portion of the top base element 122 that forms a deflectable beam. When the switch is activated, a processing device on the main logic board 180 can determine the amount of force applied to the top base element 122 based on a signal or signals produced by one or more strain gauges of the force sensor 132 on the deflectable beam of the top base element 122. Although only one force sensor 132 is shown, other embodiments can include multiple force sensors. For example, two or more force sensors can be disposed on the lower surface 112 of the housing 110 and/or under the top base element 122.

The force sensor 132 can provide an analog output based on the amount of applied force. In other words, the force sensor 132 need not be binary in that the force sensor 132 does not register an input or not register an input. The force sensor 132 can have multiple output states or signal levels based on the amount of force applied to the top base element 122. Additionally or alternatively, the force sensor 132 can provide a binary output based on a threshold force.

One or more force sensors can also be disposed on the lower surface 112 of the housing 110 below one or more of the buttons 144 extending through the middle base element 142. Additionally or alternatively, a force sensor can be provided on the middle base element 142 (e.g., on a rear or interior-facing side). The force sensor for the buttons 144 can detect actuation of the buttons 144 by a user as a user input corresponding to the function of the actuated button. The force sensor can provide an output that is binary or analog, as described herein with respect to the force sensor 132.

One or more force sensors 172 can also be disposed on the lower surface 112 of the housing 110 below the bottom base element 162. Additionally or alternatively, force sensors 172 can be provided on the bottom base element 162 (e.g., on a rear or interior-facing side). The force sensors 172 can be similar or identical to the force sensor 132. Examples of a force sensor 172 can include strain gauges, dome switches, piezoelectric sensors, optical encoders, proximity sensors, capacitive sensor, and combinations thereof.

When a force is applied to the bottom base element 162, such as when a finger presses down on the input features 164, the bottom base element 162 bends and/or tilts in a manner that is detectable by one or more of the force sensors 172. For example, the bottom base element 162 can tilt about different axis that pass through a single fulcrum (e.g., positioned between opposing pairs of the force sensors 172). Such tilting or other movement can be facilitated by the separation between the bottom base element 162 and the middle base element 142 and/or guided by features of the housing 110 (e.g., trim, rails, walls, grooves, or other guides that limit a range of motion of the bottom base element 162). When a force sensor 172 detects a force, a processing device on the main logic board 180 can determine the presence and/or amount of force applied to the bottom base element 162 based on a signal or signals produced by the force sensor 172. The location of the force (e.g., which input feature 164 is pressed) can be determined based on which of the force sensors 172 makes a detection and/or which of the force sensors 172 detects the largest force. A corresponding signal can be produced as an indication that the user have provided an input on the corresponding input feature 164. Each force sensor 172 can provide an output that is binary or analog, as described herein with respect to the force sensor 132.

One or more of the base elements can include a touch sensor. A touch sensor can include, for example, a capacitive touch sensor that extends along at least a portion of the top base element 122, the middle base element 142, and/or the bottom base element 162. The controller device 100 can include multiple touch sensors. Each of the multiple touch sensors can extend within a different portion (e.g., the top base element 122, the middle base element 142, and/or the bottom base element 162). The touch sensors can be spaced apart from each other. Gestures detected by the separate touch sensors can be interpreted as different user inputs according to preprogrammed functions to be performed by the controller device 100 and/or an external device upon detection of the user gestures.

For example, a top touch sensor 126 can be provided at the top base element 122 (e.g., at a rear surface thereof). The top touch sensor 126 can be operated to detect contact and/or proximity at the top base element 122 by a finger of the user, another portion of the user, and/or a tool operated by the user. The top touch sensor 126 can operate in a self-capacitance mode or in a mutual capacitance mode. Accordingly, touch inputs (e.g., contact with, release from, tap against, and/or motion across the top base element 122) can be detected and communicated as user inputs. Such touch inputs can be detected independent of a force input applied at the same location.

By further example, a bottom touch sensor 166 can be provided at the bottom base element 162 (e.g., at a rear surface thereof). The bottom touch sensor 166 can be operated to detect contact and/or proximity at the bottom base element 162 and/or the input features 164 by a finger of the user, another portion of the user, and/or a tool operated by the user. The bottom touch sensor 166 can operate in a self-capacitance mode or in a mutual capacitance mode. Accordingly, touch inputs (e.g., contact with, release from, tap against, and/or motion across the bottom base element 162 and/or the input features 164) can be detected and communicated as user inputs. Such touch inputs can be detected independent of a force input applied at the same location.

Figure 3:
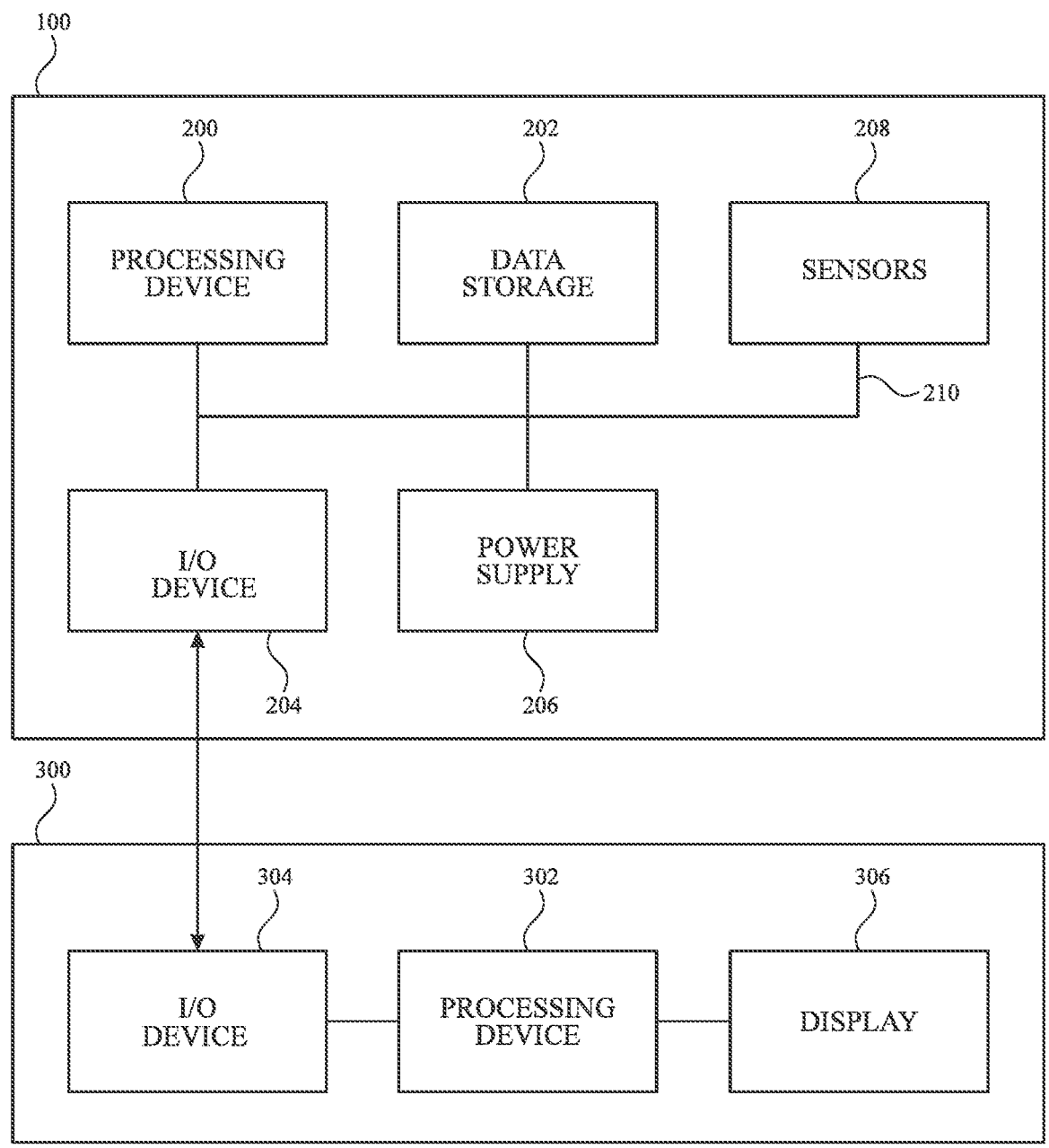
FIG. 3 illustrates a block diagram of a controller device and an external device, in accordance with some embodiments of the present disclosure.

Referring now to FIG. 3, components of a controller device can be operably connected to each other and/or an external device to provide desired functions. FIG. 3 shows a simplified block diagram of an illustrative controller device 100 and an external device 300 in accordance with one embodiment of the invention. It will be appreciated that components described herein can be provided on either or both of multiple segments of any of the controller devices described herein.

The controller device 100 can include one or more processing devices 200, one or more data storage devices 202, input/output (I/O) device 204, a power source 206, and one or more sensors 208. The one or more processing devices 200 can control some or all of the operations of the controller device 100. The processing device 200 can communicate, either directly or indirectly, with substantially all of the components of the controller device 100. For example, one or more system buses or signal lines 210 or other communication mechanisms can provide communication between the processing device 200, the data storage device 202, the I/O device 204, the power source 206, and/or the sensor 208. The processing device 200 can be implemented as any electronic device capable of processing, receiving, or transmitting data or instructions. For example, the one or more processing devices 200 can be a microprocessor, a central processing unit (CPU), an application-specific integrated circuit (ASIC), a digital signal processor (DSP), or combinations of multiple such devices. As described herein, the term "processing device" is meant to encompass a single processor or processing unit, multiple processors, multiple processing units, or other suitably configured computing element or elements.

The data storage device 202 can store electronic data that can be used by the controller device 100. For example, a data storage device can store electrical data or content such as, for example, audio files, settings and user preferences, and timing signals. The data storage device 202 can be configured as any type of memory. By way of example only, the memory can be implemented as random access memory, read-only memory, Flash memory, removable memory, or other types of storage elements, in any combination.

The input/output device 204 can receive data from a user or one or more other electronic devices. In other embodiments, the I/O device 204 can include a display, a touch sensing input surface such as a trackpad, one or more buttons, one or more microphones or speakers, a keyboard, and/or a force sensing switch or switches. For example, the one or more sensors 208 can include the force sensor 132 (e.g., switch and/or strain gauge), the force sensors 172 (e.g., switch and/or strain gauge), and/or the buttons 144 (or a sensor operably thereby). The one or more sensors 208 can further include one or more capacitive touch sensors operably the contact with the top base element 122, the middle base element 142, and/or the bottom base element 162.

The input/output device 204 or another component of the controller device 100 can provide feedback to a user operating the controller device. For example, the controller device 100 can include a haptic feedback component that provides haptic feedback with tactile sensations to the user. The haptic feedback component can be implemented as any suitable device configured to provide force feedback, vibratory feedback, tactile sensations, and the like. For example, in one embodiment, the haptic feedback component may be implemented as a linear actuator configured to provide a punctuated haptic feedback, such as a tap or a knock. Haptic feedback can be provided during operation of the controller device 100, such as while being held by a user. For example, haptic feedback can be provided in response to a user input. Additionally or alternatively, haptic feedback can be provided during attachment and/or detachment of the segments of the controller device 100. For example, the haptic feedback can be provided upon joining the segments to confirm to the user that attachment has been achieved. By further example, the haptic feedback can be provided upon separation of the segments to confirm to the user that detachment has been achieved.

The power source 206 can be implemented with any device capable of providing energy to the controller device 100. For example, the power source 206 can be one or more batteries or rechargeable batteries, or a connection cable that connects the controller device to another power source such as a wall outlet.

Additionally or alternatively, the one or more sensors 208 can include any suitable type of sensor or sensors, such as a motion sensor, a proximity sensor, an orientation sensor (e.g., gyroscope), and/or an accelerometer.

The sensors 208 can include one or more sensors for tracking position, movement, orientation, and/or one or more other characteristics of the controller device 100 during user. For example, the controller device 100 can include a camera for capturing a view of an environment external to the controller device 100. The camera can include an optical sensor, such as a photodiode or a photodiode array. Additionally or alternatively, the camera can include one or more of various types of optical sensors that are arranged in various configurations for detecting user inputs described herein. The camera may be configured to capture an image of a scene or subject located within a field of view of the camera. The image may be stored in a digital file in accordance with any one of a number of digital formats. In some embodiments, the controller device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The sensors 208 can include an inertial measurement unit ("IMU") that provides information regarding a characteristic of the controller device 100, such as inertial angles thereof. For example, the IMU can include a six-degrees of freedom IMU that calculates the controller device's position, velocity, and/or acceleration based on six degrees of freedom (x, y, z, $\theta_x$, $\theta_y$, and $\theta_z$). The IMU can include one or more of an accelerometer, a gyroscope, and/or a magnetometer. Additionally or alternatively, the controller device 100 can detect motion characteristics of the controller device 100 with one or more other motion sensors, such as an accelerometer, a gyroscope, a global positioning sensor, a tilt sensor, and so on for detecting movement and acceleration of the controller device 100. The IMU can provide data to the processing device 200 for processing.

Additionally or alternatively, the sensors 208 can include one or more environment sensors that are directed to an external environment. Such environment sensors can include any sensor that detects one or more conditions in an environment of the controller device 100. For example, an environment sensor can include an imaging device, a thermal sensor, a proximity sensor, a motion sensor, a humidity sensor, a chemical sensor, a light sensor, magnetometer, IR sensor, and/or a UV sensor. An environment sensor can be configured to sense substantially any type of characteristic such as, but not limited to, images, pressure, light, touch, force, temperature, position, motion, magnetic fields, and so on. For example, the environment sensor may be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. The sensor can be used to sense ambient conditions in a neighboring environment.

The sensors 208 can include one or more user sensors for tracking features of the user wearing the controller device 100. For example, a user sensor can perform facial feature detection, facial movement detection, facial recognition, eye tracking, user mood detection, user emotion detection, voice detection, etc. By further example, the user sensor can be a bio-sensor for tracking biometric characteristics, such as health and activity metrics. The user sensor can include a bio-sensor that is configured to measure biometrics such as electrocardiographic (ECG) characteristics, galvanic skin resistance, and other electrical properties of the user's body. Additionally or alternatively, a bio-sensor can be configured to measure body temperature, exposure to UV radiation, and other health-related information.

The controller device 100 can communicate with an external device 300 via the I/O device 204 and an I/O device of the external device 300. For example, the input/output device 204 can facilitate transmission of data to the external device 300. By further example, an I/O device 204 can transmit electronic signals via a wireless or wired connection. Examples of wireless and wired connections include, but are not limited to, WiFi, Bluetooth, infrared, and Ethernet. Examples of external devices include computers, tablet computing devices, video streaming media player devices, and/or gaming devices. Such devices can include or be connected to a display 306 that outputs visual information to the user. Other outputs are contemplated, including audio. Such operations of the external device 300 can be managed by a processing device 302 thereof.

The controller devices described herein can provide segmented configurations that allow users to easily operate the controller device in multiple modes. The controller device can provide segments that are operable in a unified configuration (e.g., by one user) or in a separated configuration (e.g., by multiple users each operating one of the segments). The controller device, with segments joined together, can be operated in one mode (e.g., as a remote control for a television or media player), and the segments, when separated, can each by operated in another mode (e.g., as game controllers for a gaming system).

Figure 4:
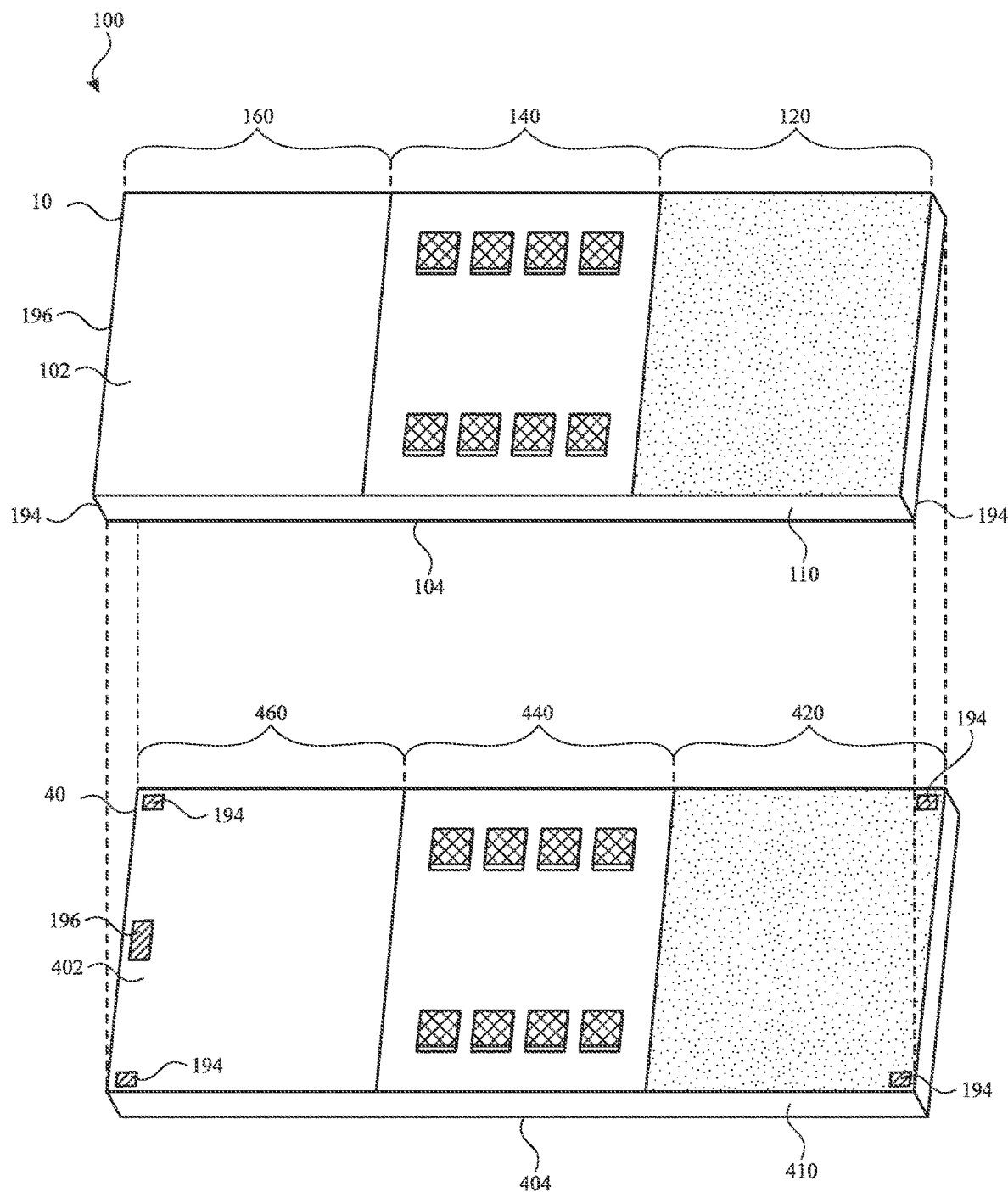
FIG. 4 illustrates a perspective view of a segmented controller device, in accordance with some embodiments of the present disclosure.

Referring now to FIG. 4, the controller device 100 can be separable into distinct (e.g., front and rear) segments to provide multiple users with input capabilities. As shown in FIG. 4, each of the front segment 10 and the rear segment 40 are separable from each other, each providing one or more features described herein with respect to the controller device 100 of FIGS. 1 and 2. For example, the front segment 10 can provide a top input region 120, a middle input region 140, and a bottom input region 160 on a front side 102 thereof and a housing 110 on a rear side 104 thereof. By further example, the rear segment 40 can provide a top input region 420, a middle input region 440, and a bottom input region 460 on a front side 402 thereof and a housing 410 on a rear side 404 thereof. The front segment 10 and the rear segment 40 can provide the same, similar, or some of the same input capabilities as each other, for example as described herein with respect to the top input region 120, the middle input region 140, and the bottom input region 160. By further example, the top input region 420, the middle input region 440, and the bottom input region 460 can provide the same inputs as the top input region 120, the middle input region 140, and the bottom input region 160.

As shown in FIG. 4, the rear segment 40 is attachable at its front side 402 to the rear side 104 of the front segment 10. When the rear segment 40 is attached to the front segment 10, the components of the rear segment 40 can be operably connected to the components of the front segment 10. The user can operate at least some of the features of the front segment 10, while some of the features of the rear segment 40 may be blocked from access and/or protected from wear and exposure by the front segment 10.

The rear segment 40 can include one or more attachment elements 194 (e.g., on the front side 402) configured to facilitate mechanical coupling or connection of the front segment 10 and the rear segment 40 by engaging complementary attachment elements of the front segment 10 (e.g., on the rear side 104). The attachment elements 194 can include protrusions, grooves, locks, latches, snaps, screws, clasps, threads, magnets, and/or pins can be included on the front segment 10 and/or the rear segment 40 for securely attaching the rear segment 40 to the front segment 10.

The front segment 10 and the rear segment 40 can each include one or more communication interfaces 196 that facilitate a communication link between the front segment 10 and the rear segment 40. The communication interfaces 196 can include one or more of a variety of features, such as electrical connectors, pogo pins, conductive surfaces, wireless receivers/transmitters, and/or inductive coupling features (e.g., coils) for communicably coupling the components of the rear segment 40 and the front segment 10.

While separate, the front segment 10 and the rear segment 40 can each be operated to independently communicate with an external device. Additionally or alternatively, one of the front segment 10 and the rear segment 40 can communicate with the other, which in turn communicates with the external device on behalf of both segments.

Figure 5:
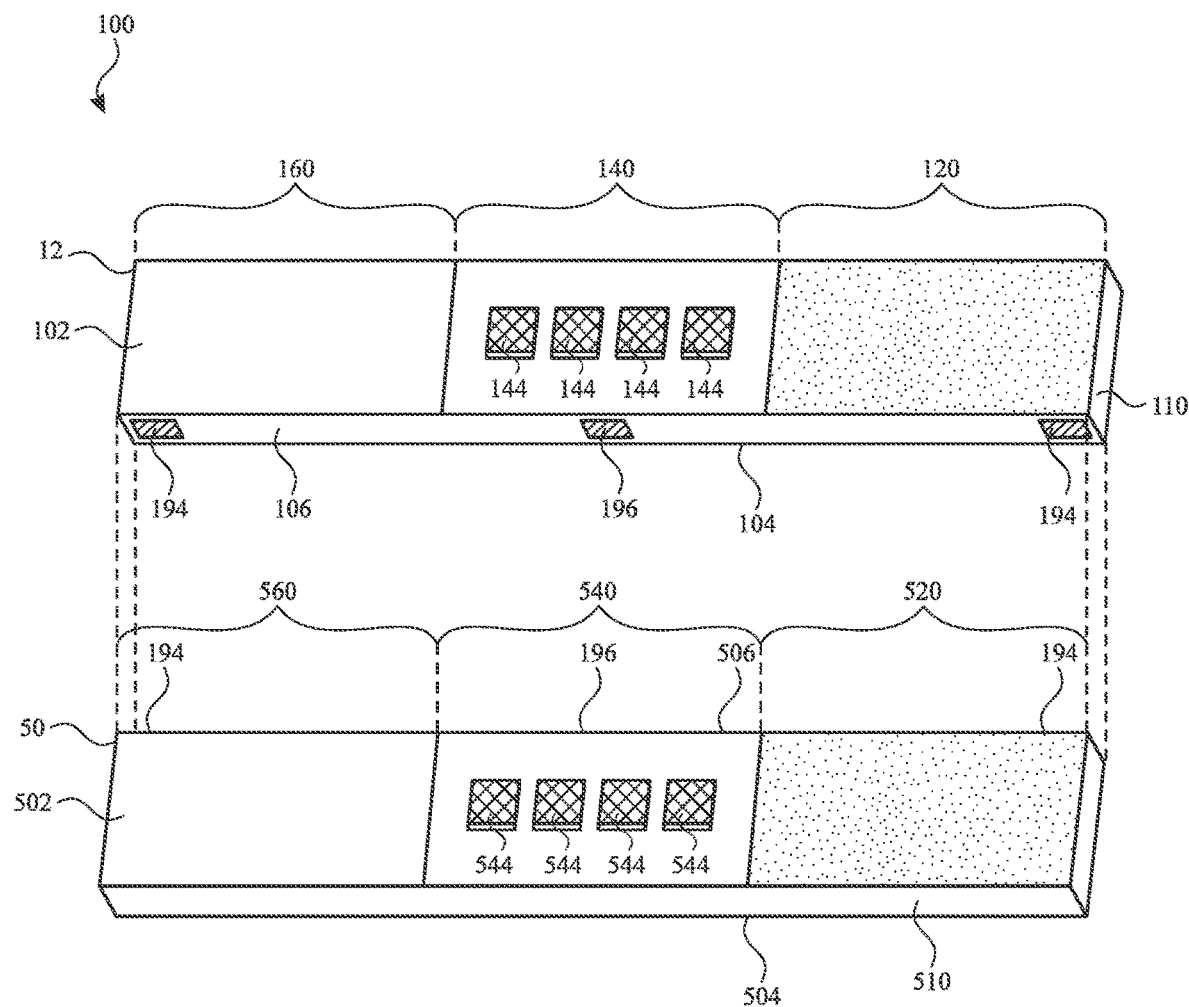
FIG. 5 illustrates a perspective view of a segmented controller device, in accordance with some embodiments of the present disclosure.

Referring now to FIG. 5, the controller device 100 can be separable into distinct lateral (e.g., left and right) segments to provide multiple users with input capabilities. As shown in FIG. 5, each of the left segment 12 and the right segment 50 are separable from each other, each providing one or more features described herein with respect to the controller device 100 of FIGS. 1 and 2. For example, the left segment 12 can provide a top input region 120, a middle input region 140, and a bottom input region 160 on a front side 102 thereof and a housing 110 on a rear side 104 thereof. By further example, the right segment 50 can provide a top input region 520, a middle input region 540, and a bottom input region 560 on a front side 502 thereof and a housing 510 on a rear side 504 thereof. The left segment 12 and the right segment 50 can provide the same, similar, or some of the same input capabilities as each other, for example as described herein with respect to the top input region 120, the middle input region 140, and the bottom input region 160. By further example, the top input region 520, the middle input region 540, and the bottom input region 560 can provide the same inputs as the top input region 120, the middle input region 140, and the bottom input region 160.

As shown in FIG. 5, the right segment 50 is attachable at its inner lateral side 506 to the inner lateral side 106 of the left segment 12. When the right segment 50 is attached to the left segment 12, the components of the right segment 50 can be operably connected to the components of the left segment 12. The user can operate at least some of the features of both the left segment 12 and right segment 50. For example, the input regions of each can be combined to form continuous or otherwise adjacent input regions.

The right segment 50 can include one or more attachment elements 194 (e.g., on the inner lateral side 506) configured to facilitate mechanical coupling or connection of the left segment 12 and the right segment 50 by engaging complementary attachment elements of the left segment 12 (e.g., on the inner lateral side 106), as described above. The left segment 12 and the right segment 50 can each include one or more communication interfaces 196 that facilitate a communication link between the left segment 12 and the right segment 50, as described above.

While separate, the front segment 10 and the rear segment 40 can each be operated to independently communicate with an external device. Additionally or alternatively, one of the front segment 10 and the rear segment 40 can communicate with the other, which in turn communicates with the external device on behalf of both segments.

Figure 6:
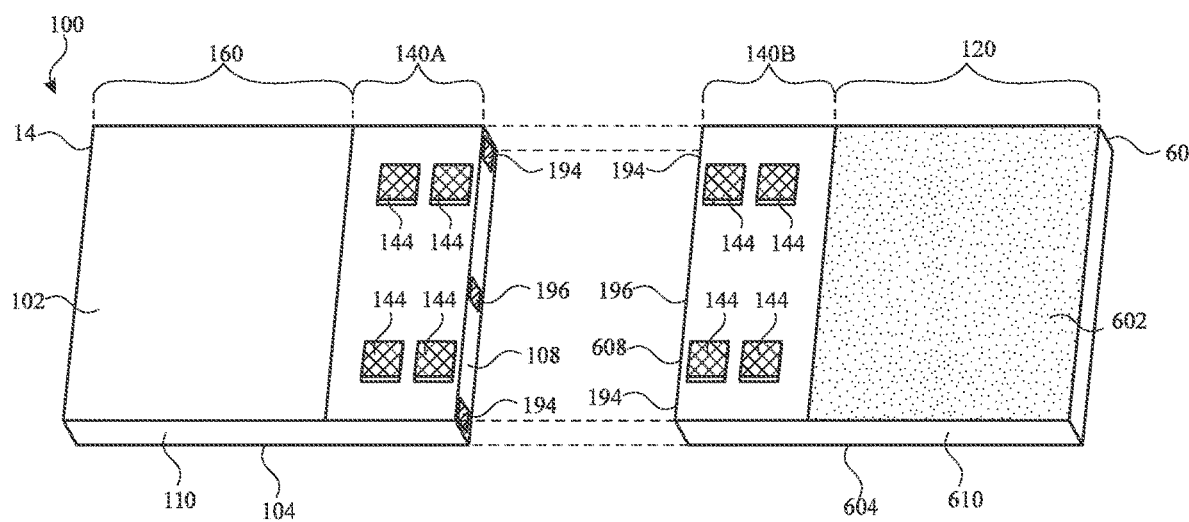
FIG. 6 illustrates a perspective view of a segmented controller device, in accordance with some embodiments of the present disclosure.

Referring now to FIG. 6, the controller device 100 can be separable into distinct transverse (e.g., top and bottom) segments to provide multiple users with input capabilities. As shown in FIG. 6, each of the bottom segment 14 and the top segment 60 are separable from each other, each providing one or more features described herein with respect to the controller device 100 of FIGS. 1 and 2. For example, the bottom segment 14 can provide a bottom input region 160 and/or at least a portion of the middle input region 140 (e.g., first middle input region 140A) on a front side 102 thereof and a housing 110 on a rear side 104 thereof. By further example, the top segment 60 can provide a top input region 120 and/or at least a portion of a middle input region 140 (e.g., second middle input region 140B) on a front side 602 thereof and a housing 610 on a rear side 604 thereof. The bottom segment 14 and the top segment 60 can provide the same, similar, or some of the same input capabilities as each other, for example as described herein with respect to the top input region 120, the middle input region 140, and the bottom input region 160. Additionally or alternatively, the top input region 120 and the bottom input region 160 can provide different input capabilities. The middle input region 140 can be provided entirely on the bottom segment 14, entirely on the top segment 60, or divided between the bottom segment 14 and the top segment 60.

As shown in FIG. 6, the top segment 60 is attachable at its inner transverse side 608 to the inner transverse side 108 of the bottom segment 14. When the top segment 60 is attached to the bottom segment 14, the components of the top segment 60 can be operably connected to the components of the bottom segment 14. The user can operate at least some of the features of both the bottom segment 14 and top segment 60. For example, the input regions of each can be combined to form continuous or otherwise adjacent input regions.

The top segment 60 can include one or more attachment elements 194 (e.g., on the inner transverse side 608) configured to facilitate mechanical coupling or connection of the bottom segment 14 and the top segment 60 by engaging complementary attachment elements of the bottom segment 14 (e.g., on the inner transverse side 108), as described above. The bottom segment 14 and the top segment 60 can each include one or more communication interfaces 196 that facilitate a communication link between the bottom segment 14 and the top segment 60, as described above.

While separate, the bottom segment 14 and the top segment 60 can each be operated to independently communicate with an external device. Additionally or alternatively, one of the bottom segment 14 and the top segment 60 can communicate with the other, which in turn communicates with the external device on behalf of both segments.

In some embodiments, the bottom segment 14 and/or the top segment 60 can be operated with movement across a surface (e.g., as a mouse input device). For example, the bottom segment 14 and/or the top segment 60 can provide an optical sensor or other sensor that tracks movement over a surface. The input regions of the bottom segment 14 and/or the top segment 60 can provide additional inputs for operation by a user. Both the movements and the touch and/or force inputs can be communicated to an external device as user inputs provided in the manner of mouse operations.

Figure 7:
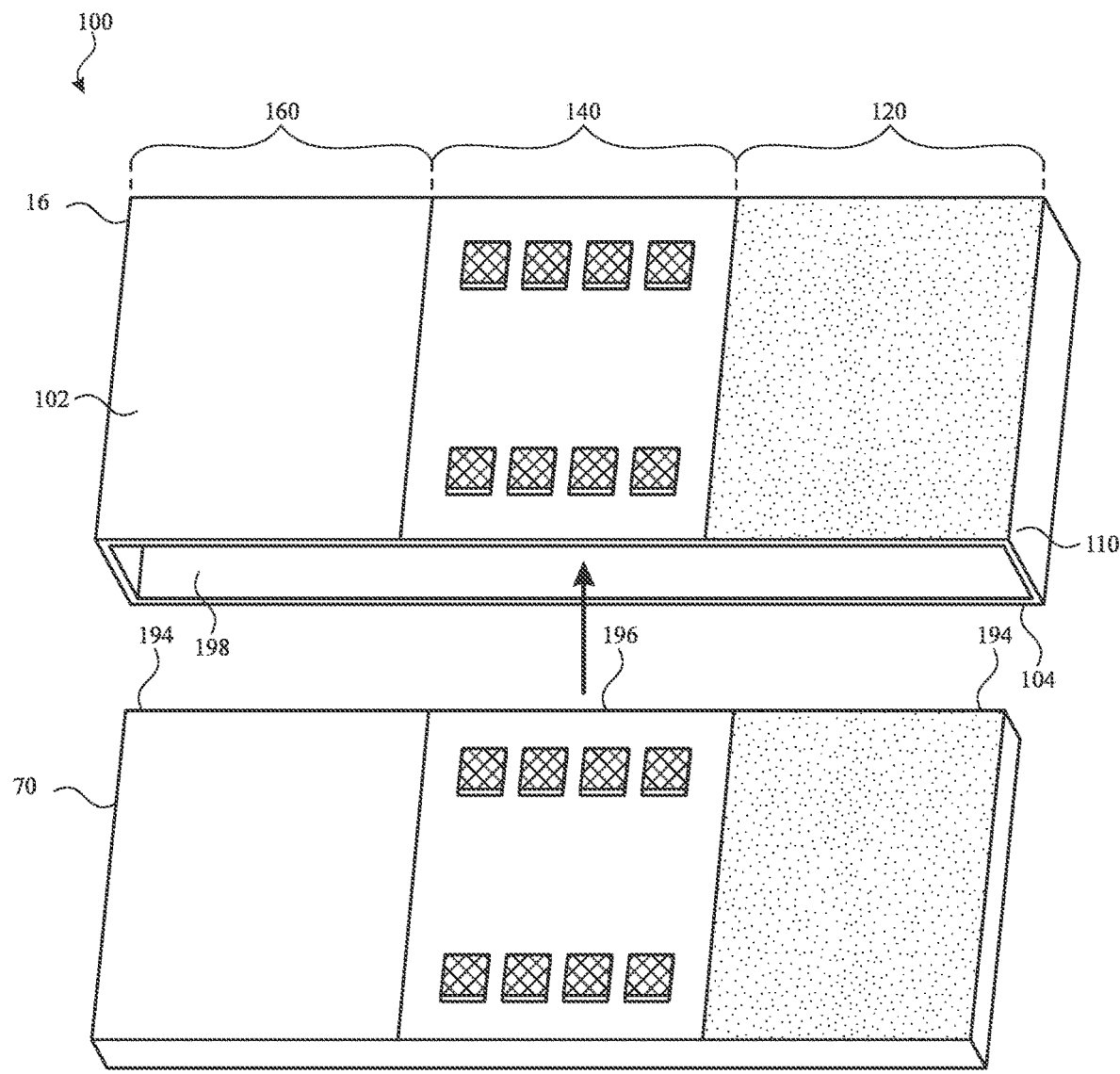
FIG. 7 illustrates a perspective view of a nesting controller device, in accordance with some embodiments of the present disclosure.

Referring now to FIG. 7, the controller device 100 can be separable into distinct nested segments to provide multiple users with input capabilities. As shown in FIG. 7, each of the outer segment 16 and the inner segment 70 are separable from each other, each providing one or more features described herein with respect to the controller device 100 of FIGS. 1 and 2. For example, the outer segment 16 and the inner segment 70 can each provide a top input region 120, a middle input region 140, and a bottom input region 160 on a front side 102 thereof and a housing 110 on a rear side 104 thereof. The outer segment 16 and the inner segment 70 can provide the same, similar, or some of the same input capabilities as each other, for example as described herein with respect to the top input region 120, the middle input region 140, and the bottom input region 160. The housing 110 of the outer segment 16 can provide a recess 198 for receiving and securely containing the inner segment 70.

As shown in FIG. 7, the inner segment 70 is insertable into the recess 198 of the outer segment 16. When the inner segment 70 is received within the outer segment 16, the components of the inner segment 70 can be operably connected to the components of the outer segment 16. The user can operate at least some of the features of the outer segment 16, while some of the features of the inner segment 70 may be blocked from access and/or protected from wear and exposure by the outer segment 16.

The inner segment 70 can include one or more attachment elements 194 (e.g., on an outer surface thereof) configured to facilitate mechanical coupling or connection of the outer segment 16 and the inner segment 70 by engaging complementary attachment elements of the outer segment 16 (e.g., on an inner surface within the recess 198), as described above. The outer segment 16 and the inner segment 70 can each include one or more communication interfaces 196 that facilitate a communication link between the outer segment 16 and the inner segment 70, as described above.

While separate, the outer segment 16 and the inner segment 70 can each be operated to independently communicate with an external device. Additionally or alternatively, one of the outer segment 16 and the inner segment 70 can communicate with the other, which in turn communicates with the external device on behalf of both segments.

Figure 8:
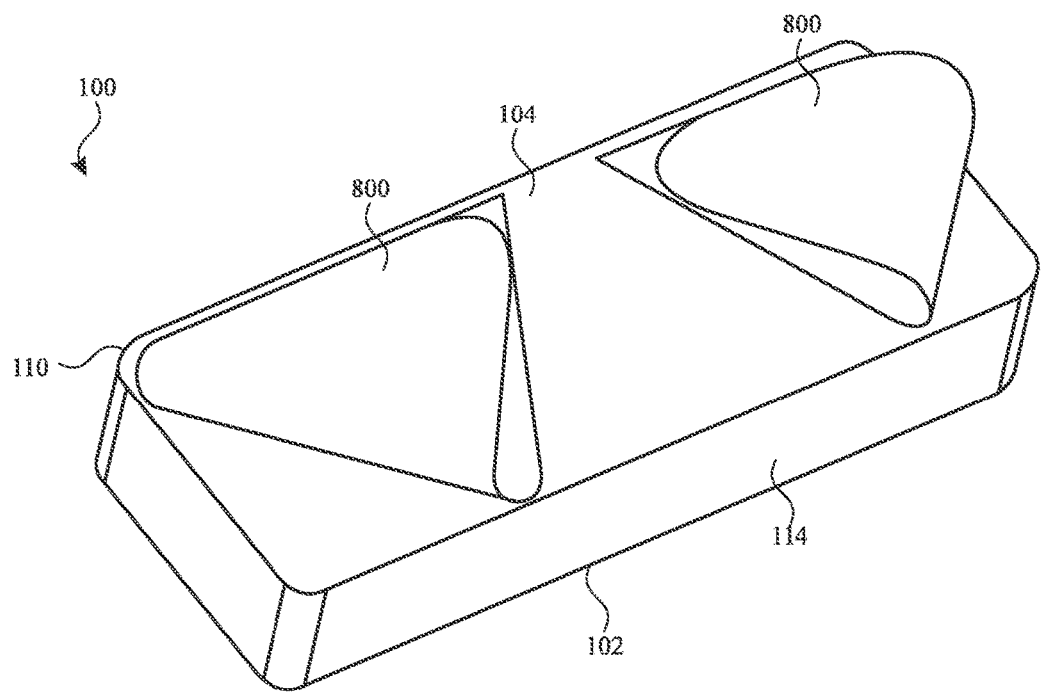
FIG. 8 illustrates a perspective rear view of a controller device with handles in a stowed configuration, in accordance with some embodiments of the present disclosure.
Figure 9:
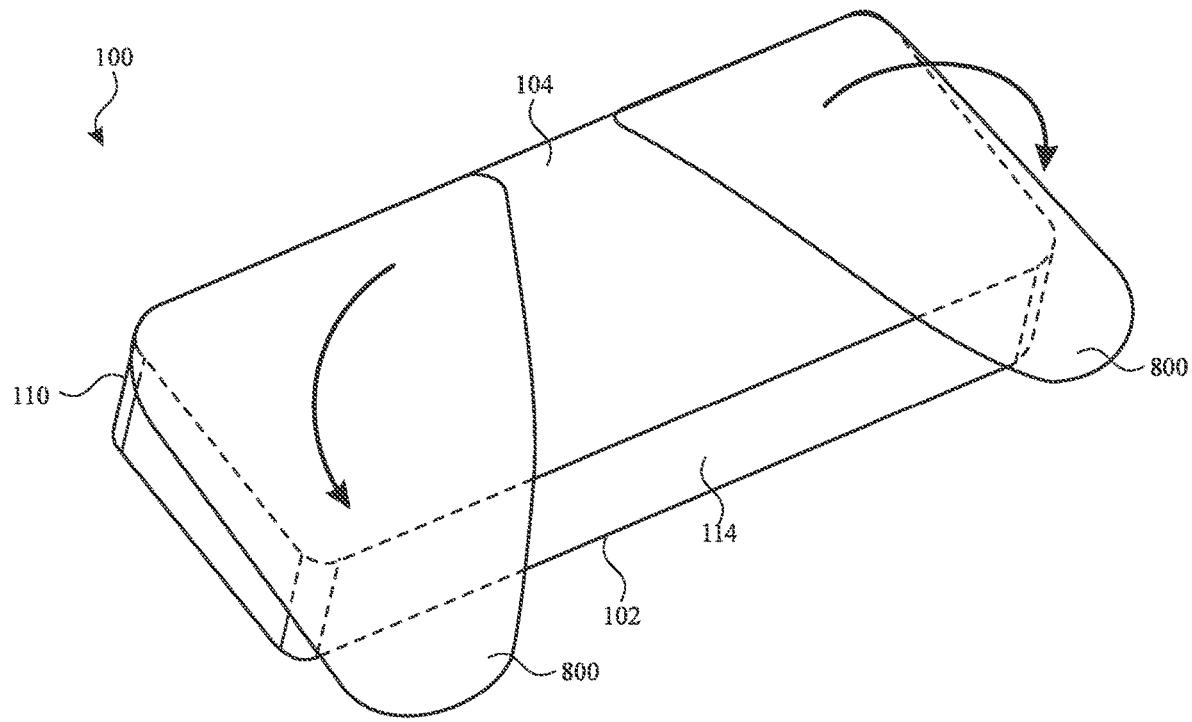
FIG. 9 illustrates a perspective rear view of the controller device of FIG. 8 with the handles in a deployed configuration, in accordance with some embodiments of the present disclosure.

Referring now to FIGS. 8 and 9, the controller device can provide features that facilitate handling and operation by a user in each of multiple modes. Where the controller device is held in different positions and/or orientations in the different modes, such features can provide comfortable grip to facilitate ease of handling and input by the user.

As described herein, the controller device 100 can be operated in a first mode in which it is held in one hand by a user. In this mode of operation, a top end (e.g., containing one of the input regions) of the controller device 100 can be pointed generally in the direction of the external device to be controlled, and a bottom end (e.g., containing another of the input regions) of the controller device 100 can be pointed toward the user. The user can operate inputs on any one or more of the input regions with touch and/or force input. For example, the user may provide a thumb on the front side 102 while the rear side 104 rests in or near the palm of the hand. While any of the input regions can be within the reach of the user, a middle (e.g., second) input region can be readily accessible and provide input members (e.g., buttons) for controlling an external device with user inputs, such as volume control, channel control, a home button, a select button, navigation buttons, pause or play buttons, and a device or mode button.

The controller device 100 can be provided with one or more support members 800 that transition between a stowed configuration and a deployed configuration. As shown in FIG. 8, the support members 800 can be stowed so that they are entirely within a boundary defined by an outer periphery of the housing 110 (e.g., the sidewalls 114). For example, the support members 800 can optionally be arranged in the stowed configuration such that no portion of the support members 800 extends outwardly beyond the boundary defined by the sidewalls 114. As such, the support members 800 can remain unseen on the rear side 104 while the controller device 100 (e.g., the input members on the input regions) are viewed and operated at the front side 102. In the stowed configuration, the support members 800 can minimize an outer dimension of (e.g., distance across) the controller device 100. In the stowed configuration, the support members 800 can define a shape (e.g., convex) that complements the shape of the palm into which the support members 800 may rest. For example, the support members 800 can generally conform to (e.g., lie flat against) the shape of the rear side 104 of the housing 110, such that the controller device 100 fits in the palm of the hand in a manner that is substantially similar to how it would fit with the support members 800 being absent.

The controller device 100 can further be operated in a second mode, in which it is held in both hands of the user. In this mode of operation, the top end of the controller device 100 can be held in one of the hands, and the bottom end of the controller device 100 can be held in the other hand. The user can operate inputs on any one or more of the input regions with touch and/or force input. For example, the user may provide one thumb on an input region (e.g., the top input region) the front side 102 and another thumb on another input region (e.g., the bottom input region) the front side 102. During such operation, the rear side 104 rests in or near the palms of the hands. While any of the input regions can be within the reach of the user's thumbs, one input region (e.g., the top input region) can be readily accessible and provide input members (e.g., the top base element) for controlling an external device with user inputs such as action controls. Another input region (e.g., the bottom input region) can be readily accessible and provide input members (e.g., the input features) for controlling an external device with user inputs such as directional controls.

As shown in FIG. 9, the support members 800 can transition to a deployed configuration in which they extend from each of the opposing ends of the housing 110 at the rear side 104, past the sidewalls 114. Accordingly, the support members 800 can be unfolded or otherwise deployed to facilitate movement outwardly with respect to the housing 110 from the stowed configuration (e.g., on the rear side 104) to the deployed configuration (e.g., extending beyond the sidewalls 114). By further example, the support members 800 can be rotatably (e.g., by a hinge) coupled to the housing 110 to transition between a stowed configuration and deployed configuration. It will be understood that other mechanisms can be used to deploy the support members 800, including sliding, expanding, unrolling, and the like. In the deployed configuration, the support members 800 can increase the outer dimension of (e.g., distance across) the controller device 100. In the deployed configuration, the support members 800 can define shapes (e.g., convex) that complements the shapes of the palms into which the support members 800 may rest.

The transition of the support members 800 between the stowed configuration and the deployed configuration can be actively and/or passively managed. For example, the controller device 100 can provide a stimulus or other action that transitions the support members 800 between the stowed configuration and the deployed configuration. Additionally or alternatively, the user can manually operate the support members 800 to transition them between the stowed configuration and the deployed configuration.

Referring now to FIGS. 10-12, one or more input members of the controller device can transition between a stowed configuration and a deployed configuration. Where the controller device is held in different positions and/or orientations for operation in different modes, the input members can be either deployed for receiving inputs or stowed to remain out of the way.

As shown in FIG. 10, one or more input members 910 can transition to a deployed configuration in which they extend from the housing 110 (e.g., the sidewalls). Accordingly, the input members 910 can be rotatably (e.g., by a hinge) coupled to the housing 110 to facilitate rotation with respect to the housing 110 from the stowed configuration (e.g., within a recess of the housing 110) to the deployed configuration (e.g., extending beyond the housing 110). The input members 910 can be readily accessible by fingers of the user while the controller device 100 is held across both hands of the user.

The input members 910 can be stowed so that they are entirely within (e.g., flush with) a boundary defined by an outer periphery of the housing 110 (e.g., the sidewalls). For example, the input members 910 can optionally be arranged in the stowed configuration such that no portion of the input members 910 extends outwardly beyond the boundary defined by the housing 110. In the stowed configuration, the input members 910 may be less accessible by a user by not protruding from the housing 110. While hinge-based rotation is illustrated, it will be understood that other mechanisms can be used to deploy the input members 910, including sliding, expanding, unfolding, unrolling, and the like. For example, input members 920 are shown in a sliding arrangement with the housing 110.

As shown in FIG. 11, an input member 930 (e.g., joystick) can transition to a deployed configuration in which it extends from the front side 102 of the controller device 100. Accordingly, the input member 930 can be slidably coupled to the front side 102 to facilitate translational deployment by ejecting the input member 930 from the stowed configuration (e.g., at least partially within a recess 940 on the front side 102 and/or extending into an interior of the controller device 100) to the deployed configuration (e.g., extending above the front side 102). The deployment can occur by moving the input member 930 along an axis of deployment. In the deployed configuration, the input member 930 may move transverse to the axis of deployment, for example in multiple directions. The movement of the input member 930 while in the deployed configuration can represent directional commands to be executed by a program on an external device. Each of the directional commands can correspond to a direction shown on a display of the external device. The input member 930 can be stowed so that it is at least partially within (e.g., flush with) a boundary defined by an outer periphery at the front side 102. For example, the input member 930 can optionally be arranged in the stowed configuration such that at least some of the input member 930 does not extend outwardly beyond the front side 102. In the stowed configuration, the input member 930 be less accessible by a user by not protruding as much from the front side 102 and not pivoting and/or moving transversely to the axis of deployment.

As shown in FIG. 12, an input member 950 (e.g., joystick) can transition to a deployed configuration in which it extends from the front side 102 of the controller device 100. Accordingly, the input member 950 can be rotatably (e.g., by a hinge) coupled to the front side 102 to facilitate rotational deployment by lifting the input member 950 from the stowed configuration (e.g., at least partially within a recess 960 on the front side 102) to the deployed configuration (e.g., extending above the front side 102). The deployment can occur by pivoting the input member 950 about an axis of deployment. In the deployed configuration, the input member 950 may move and/or rotate about other axes, for example in multiple directions. The movement of the input member 950 while in the deployed configuration can represent directional commands to be executed by a program on an external device. Each of the directional commands can correspond to a direction shown on a display of the external device. The input member 950 can be stowed so that it is at least partially within (e.g., flush with) a boundary defined by an outer periphery at the front side 102. For example, the input member 950 can optionally be arranged in the stowed configuration such that at least some of the input member 950 does not extend outwardly beyond the front side 102. In the stowed configuration, the input member 950 be less accessible by a user by not protruding as much from the front side 102 and not pivoting and/or moving in the manner for providing directional commands.

Figure 13:
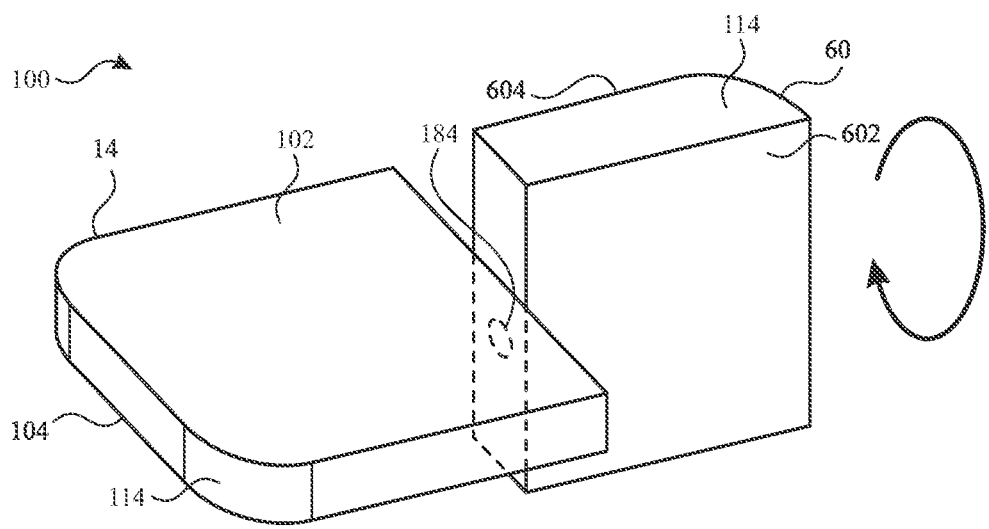
FIG. 13 illustrates a perspective view of a controller device, in accordance with some embodiments of the present disclosure.

Referring now to FIG. 13, the controller device 100 can be provided with adjustable segments that rotate or otherwise move relative to each other. Each of the bottom segment 14 and the top segment 60 can provide one or more features described herein with respect to the controller device 100 of FIGS. 1 and 2. For example, the bottom segment 14 can provide a bottom input region and/or at least a portion of the middle input region (e.g., first middle input region) on a front side 102 thereof. By further example, the top segment 60 can provide a top input region and/or at least a portion of a middle input region (e.g., second middle input region) on a front side 602 thereof. The bottom segment 14 and the top segment 60 can provide the same, similar, or some of the same input capabilities as each other, for example as described herein with respect to the top input region 120, the middle input region 140, and the bottom input region 160 of FIGS. 1 and 2. Additionally or alternatively, the bottom segment 14 and the top segment 60 can provide different input capabilities. The middle input region can be provided entirely on the bottom segment 14, entirely on the top segment 60, or divided between the bottom segment 14 and the top segment 60.

As shown in FIG. 13, each of the bottom segment 14 and the top segment 60 are rotatable relative to each other. The bottom segment 14 and the top segment 60 can rotate about a pivot member 184 that rotatably couples the bottom segment 14 to the top segment 60. For example, the pivot member 184 can facilitate rotation about an axis that extends through both the bottom segment 14 and the top segment 60. In at least one configuration, the front side 102 of the bottom segment 14 can be parallel to and/or coplanar with the front side 602 of the top segment 60. As the bottom segment 14 rotates relative to the top segment 16, the front side 102 and the front side 602 can be adjusted so that they are no longer parallel or coplanar. The rotation can be achieved to any degree desired by a user. Optionally, the bottom segment 14 of the top segment 60 can be maintained in one or more relative rotational orientations, for example by a detent, lock, or other engagement member. In some embodiments, the relative rotation of the bottom segment 14 relative to the top segment 60 can be interpreted as a user input that is optionally communicated to another device.

In some embodiments, the bottom segment 14 can provide input members (buttons, touch input, input region, etc.) on one or both of the front side 102 and the rear side 104. In some embodiments, the top segment 60 can provide input members (buttons, touch input, input region, etc.) on one or both of the front side 602 and the rear side 604. Where the bottom segment 14 and the top segment 60 are rotatable relative to each other, either one of the front side 102 or the rear side 104 of the bottom segment 14 can be aligned either one of the front side 602 or the rear side 604 of the top segment. As such, the different sides of different segments can provide different inputs so that different combinations of aligned sides provide the user with different input options. The user can select the desired combination of readily available input options by rotating the segments to align the desired sides.

Figure 14:
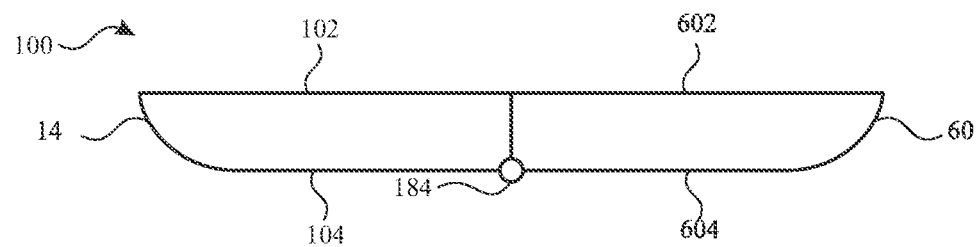
FIG. 14 illustrates a side view of a controller device in a deployed configuration, in accordance with some embodiments of the present disclosure.
Figure 15:
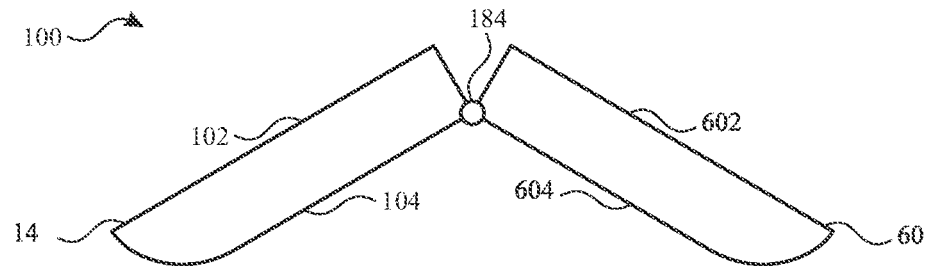
FIG. 15 illustrates a side view of the controller device of FIG. 14 in a partially folded configuration, in accordance with some embodiments of the present disclosure.
Figure 16:
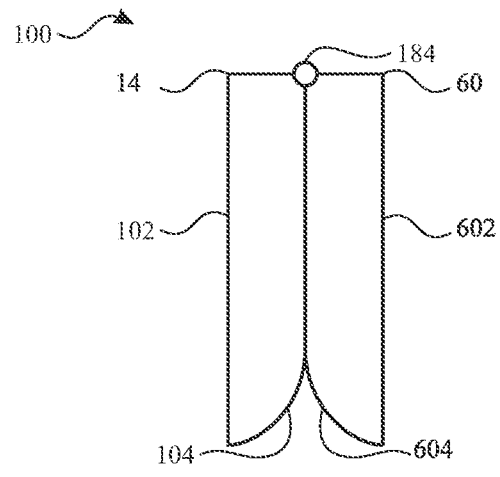
FIG. 16 illustrates a side view of a controller device of FIGS. 14 and 15 in a folded configuration, in accordance with some embodiments of the present disclosure.

Referring now to FIGS. 14-16, the controller device 100 can be provided with foldable segments that rotate or otherwise move relative to each other. Each of the bottom segment 14 and the top segment 60 can provide one or more features described herein with respect to the controller device 100 of FIGS. 1 and 2. For example, the bottom segment 14 can provide a bottom input region and/or at least a portion of the middle input region (e.g., first middle input region) on a front side 102 thereof. By further example, the top segment 60 can provide a top input region and/or at least a portion of a middle input region (e.g., second middle input region) on a front side 602 thereof. The bottom segment 14 and the top segment 60 can provide the same, similar, or some of the same input capabilities as each other, for example as described herein with respect to the top input region 120, the middle input region 140, and the bottom input region 160 of FIGS. 1 and 2. Additionally or alternatively, the bottom segment 14 and the top segment 60 can provide different input capabilities. The middle input region can be provided entirely on the bottom segment 14, entirely on the top segment 60, or divided between the bottom segment 14 and the top segment 60.

As shown in FIGS. 14-16, each of the bottom segment 14 and the top segment 60 are rotatable relative to each other to transition between a folded configuration and a deployed configuration. For example, the bottom segment 14 and the top segment 60 can rotate about a pivot member 184 that rotatably couples the bottom segment 14 to the top segment 60. By further example, the pivot member 184 can facilitate rotation about an axis that extends alongside and/or between the bottom segment 14 and the top segment 60. In at least one configuration, such as the configuration shown in FIG. 14, the front side 102 of the bottom segment 14 can be parallel to and/or coplanar with the front side 602 of the top segment 60. As the bottom segment 14 rotates relative to the top segment 16, the front side 102 and the front side 602 can be adjusted so that they are no longer coplanar. For example, the rotation can be performed until the front side 102 of the bottom segment 14 and the front side 602 of the top segment 60 are facing away from each other on opposing sides of the controller device 100.

By further example, in the deployed configuration, as shown in FIG. 16, the front side 102 of the bottom segment 14 and the front side 602 of the top segment 60 can be parallel to each other. Optionally, the bottom segment 14 and the top segment 60 can be maintained in one or more relative rotational orientations, for example by a detent, lock, or other engagement member. The bottom segment 14 and the top segment 60 can be maintained in a folded or stowed configuration by engagement members, such as protrusions, grooves, locks, latches, snaps, screws, clasps, threads, magnets, and/or pins. In the folded or stowed configuration, the controller device 100 can occupy less space, thereby facilitating storage and/or transportation thereof.

The rotation of the bottom segment 14 of the top segment 60 can be achieved and maintained at any degree desired by a user. For example, the bottom segment 14 and the top segment 60 can be maintained in a relative orientation, such as that illustrated in FIG. 15. The user can use the controller device 100 in such a configuration, wherein the angle formed by the bottom segment 14 and the top segment 60 can facilitate grip and/or user operation of the controller device 100.

The controller devices of the present disclosure can facilitate the user input operations to be communicated to an external device. Such external devices can include televisions, DVD players, stereos, game consoles, networked devices, computers, tablet computing devices, video streaming media player devices, head-mountable devices, virtual reality systems, augmented reality systems, and mixed reality systems. It will be understood that a given external device can perform one or more of the functions associated with the external devices described herein. The will be further understood that the functions associated with the external devices described herein can be performed by one or more external devices.

As discussed herein, the user inputs can be transmitted to the corresponding external device to manage one or more operations thereof. Accordingly, the input provided by the user can be interpreted as commands that are to be executed as actions performed by the external device according to the programming thereof. Such programming can be output to a user in a manner that educates the user on the relationship between the user inputs received by the controller device and the actions to be performed by the external device.

In some embodiments, the external device is a head-mountable device that is worn on a head of the user and provides visual, audio, and/or tactile output to the user. The head-mountable device can further receive inputs from the user. At least some of the inputs can be provided via the controller device 100 and communicated to the head-mountable device. The head-mountable device can thereby be operated to allow a user to provide inputs in a manner that allows the user to interact with a visual output displayed by the head-mountable device. Such visual output can include information and features overlaid with a view of a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment.

In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Accordingly, embodiments of the present disclosure provide controller devices that provide a user with multiple modes of operation. For example, the user can hold and operate the controller device in a first orientation for control of a first device and/or first mode of a device (e.g., media player), and the user can hold and operate the controller device in a second orientation for control of a second device and/or second mode of a device (e.g., gaming device). Features can be selectively stowed and deployed to facilitate user operation in the different modes. By further example, a controller device can be separated into segments to allow multiple users to hold and provide inputs with corresponding segments.

Various examples of aspects of the disclosure are described below as clauses for convenience. These are provided as examples, and do not limit the subject technology.

Clause A: a controller device comprising: a housing supporting a first force sensor and multiple second force sensors; a top input region at a first end of the controller device and comprising: a top base element configured to move against the first force sensor; and a touch sensor configured to detect contact at the top base element; a bottom input region at a second end of the controller device and comprising: a bottom base element; and input features on the bottom base element, each of the input features being above a corresponding one of the second force sensors such a force applied to one of the input features moves the bottom base element against the corresponding one of the second force sensors; and a middle input region between the top input region and the bottom input region, the middle input region comprising multiple buttons.

Clause B: a controller device comprising: a first segment; and a second segment; wherein the first segment and the second segment are configured to be operatively and detachably coupled to each other, and each of the first segment and the second segment comprise: a housing; a base element movable with respect to the housing; a touch sensor configured to detect contact at the base element; a force sensor supported by the housing and configured to detect a force applied to the base element; a button; an attachment element configured to facilitate releasable attachment between the first segment and the second segment; and a communication interface configured to facilitate communication between the first segment and the second segment.

Clause C: a controller device comprising: an input region defining a front side of the controller device; a housing defining a rear side and having sidewalls defining an outer periphery between the front side and the rear side; and support members on opposing ends of the rear side of the housing, the support members having: a stowed configuration in which the support members are within the outer periphery of the housing; and a deployed configuration in which the support members extend beyond the outer periphery of the housing.

One or more of the above clauses can include one or more of the features described below. It is noted that any of the following clauses may be combined in any combination with each other, and placed into a respective independent clause, e.g., clause A, B, or C.

Clause 1: the top base element extends continuously into the middle input region and provides openings through which the buttons extend.

Clause 2: a first portion of the top base element is configured to move against the first force sensor; and a second portion of the top base element is secured to the housing such that the first portion bends toward the housing and with respect to the second portion.

Clause 3: the second portion of the top base element is secured to the housing at the middle input region.

Clause 4: a surface of the first portion provides a texture that is different than a texture of a surface of the second portion.

Clause 5: the touch sensor is a first touch sensor; and the bottom input region further comprises a second touch sensor configured to detect contact with the bottom base element.

Clause 6: the top base element forms an opening for transmitting sound to a microphone within the housing.

Clause 7: an I/O device configured to transmit a command to an external device, the command being based on a detection by the first force sensor, one of the second force sensors, or the touch sensor.

Clause 8: the external device is a video media player.

Clause 9: the input features are arranged such that user inputs at the input features indicate directional commands that correspond to directions on a display operably connected to the external device.

Clause 10: the attachment element and the communication interface are positioned on: a rear side of the first segment, the rear side being defined by the housing; and a front side of the second segment, the front side being defined by the base element.

Clause 11: the base element is a first base element; the touch sensor is a first touch sensor; the force sensor is a first force sensor; and each of the first segment and the second segment further comprise: a second base element movable with respect to the housing; a second touch sensor configured to detect contact at the second base element; and a second force sensor supported by the housing and configured to detect a force applied to the second base element; wherein the button is between the first base element and the second base element.

Clause 12: for each of the first segment and the second segment, the button is positioned between: the base element; and the attachment element and the communication interface.

Clause 13: the first segment defines a recess, and the second segment is insertable within the recess of the first segment.

Clause 14: in the stowed configuration, the support members are folded onto the rear side with respect to the deployed configuration.

Clause 15: in the stowed configuration, the support members are within a portion of the housing and configured to slide outwardly to the deployed configuration.

Clause 16: a base element; an input member having: a stowed configuration in which the input member is against the base element; and a deployed configuration in which the input member extends away from the base element and is movable with respect to the base element to indicate a user input.

Clause 17: the input region comprises: an input member having: a stowed configuration in which the input member is against the housing; and a deployed configuration in which the input member extends away from the housing and is movable with respect to the housing to indicate a user input.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A controller device comprising:
   a front segment comprising:
      a first housing supporting a first force sensor and multiple second force sensors;
      a first attachment element on the first housing;
      a first communication interface on the first housing;
      a first top input region at a first end of the front segment and comprising:
         a top base element configured to move against the first force sensor; and
         a touch sensor configured to detect contact at the top base element;
      a first bottom input region at a second end of the front segment and comprising:
         a bottom base element; and
         input features on the bottom base element, each of the input features being above a corresponding one of the second force sensors such that a force applied to one of the input features moves the bottom base element against the corresponding one of the second force sensors; and
      a first middle input region between the first top input region and the first bottom input region, the first middle input region comprising multiple first buttons; and
   a rear segment comprising:
      a second housing supporting a third force sensor and multiple fourth force sensors;
      a second top input region at a first end of the rear segment and over the third force sensor;
      a second bottom input region at a second end of the rear segment and over the multiple fourth force sensors;
      a second middle input region between the second top input region and the second bottom input region, the second middle input region comprising multiple second buttons;
      a second attachment element opposite the second housing and configured to facilitate releasable attachment to the first attachment element; and
      a second communication interface opposite the second housing and configured to facilitate communication with the first communication interface.

2. The controller device of claim 1, wherein the top base element extends continuously into the first middle input region and provides openings through which the buttons extend.

3. The controller device of claim 2, wherein:
   a first portion of the top base element is configured to move against the first force sensor; and a second portion of the top base element is secured to the first housing such that the first portion bends toward the first housing and with respect to the second portion.

4. The controller device of claim 3, wherein the second portion of the top base element is secured to the first housing at the first middle input region.

5. The controller device of claim 3, wherein a surface of the first portion provides a texture that is different than a texture of a surface of the second portion.

6. The controller device of claim 1, wherein:
the touch sensor is a first touch sensor; and
the first bottom input region further comprises a second touch sensor configured to detect contact with the bottom base element.

7. The controller device of claim 1, wherein the top base element forms an opening for transmitting sound to a microphone within the first housing.

8. The controller device of claim 1, further comprising an I/O device configured to transmit a command to an external device, the command being based on a detection by the first force sensor, one of the second force sensors, or the touch sensor.

9. The controller device of claim 8, wherein the external device is a video media player.

10. The controller device of claim 8, wherein the input features are arranged such that user inputs at the input features indicate directional commands that correspond to directions on a display operably connected to the external device.

11. The controller device of claim 1, wherein:
each of the first attachment element and the second attachment element comprises a magnet; and
each of the first attachment element and the second attachment element comprises an electrical connector.

12. A controller device comprising:
a left segment comprising:
a first housing supporting a first force sensor and multiple second force sensors;
a first attachment element on the first housing;
a first communication interface on the first housing;
a first top input region at a first end of the left segment and comprising:
a top base element configured to move against the first force sensor; and
a touch sensor configured to detect contact at the top base element;
a first bottom input region at a second end of the left segment and comprising:
a bottom base element; and
input features on the bottom base element, each of the input features being above a corresponding one of the second force sensors such that a force applied to one of the input features moves the bottom base element against the corresponding one of the second force sensors; and
a first middle input region between the first top input region and the first bottom input region, the first middle input region comprising multiple first buttons; and
a right segment comprising:
a second housing supporting a third force sensor and multiple fourth force sensors;
a second top input region at a first end of the right segment and over the third force sensor;
a second bottom input region at a second end of the right segment and over the multiple fourth force sensors;
a second middle input region between the second top input region and the second bottom input region, the second middle input region comprising multiple second buttons;
a second attachment element on the second housing and configured to facilitate releasable attachment to the first attachment element; and
a second communication interface on the second housing and configured to facilitate communication with the first communication interface.

13. The controller device of claim 12, wherein the top base element extends continuously into the first middle input region and provides openings through which the buttons extend.

14. The controller device of claim 13, wherein:
a first portion of the top base element is configured to move against the first force sensor; and
a second portion of the top base element is secured to the first housing such that the first portion bends toward the first housing and with respect to the second portion.

15. The controller device of claim 14, wherein the second portion of the top base element is secured to the first housing at the first middle input region.

16. The controller device of claim 12, wherein:
each of the first attachment element and the second attachment element comprises a magnet; and
each of the first attachment element and the second attachment element comprises an electrical connector.

17. A controller device comprising:
a bottom segment comprising:
a first housing supporting a first force sensor and multiple second force sensors;
a first top input region at a first end of the bottom segment and comprising:
a top base element configured to move against the first force sensor; and
a touch sensor configured to detect contact at the top base element;
a first bottom input region at a second end of the bottom segment and comprising:
a bottom base element; and
input features on the bottom base element, each of the input features being above a corresponding one of the second force sensors such that a force applied to one of the input features moves the bottom base element against the corresponding one of the second force sensors;
a first middle input region between the first top input region and the first bottom input region, the first middle input region comprising multiple first buttons;
a first attachment element on a portion of the first housing that is beneath the first middle input region; and
a first communication interface on the portion of the first housing that is beneath the first middle input region; and
a top segment comprising:
a second housing supporting a third force sensor and multiple fourth force sensors;
a second top input region at a first end of the top segment and over the third force sensor;
a second bottom input region at a second end of the top segment and over the multiple fourth force sensors;

a second middle input region between the second top input region and the second bottom input region, the second middle input region comprising multiple second buttons;

a second attachment element on a portion of the second housing that is beneath the second middle input region and configured to facilitate releasable attachment to the first attachment element; and a second communication interface on the portion of the second housing that is beneath the second middle input region and configured to facilitate communication with the first communication interface.

18. The controller device of claim 17, wherein the top base element extends continuously into the first middle input region and provides openings through which the buttons extend.

19. The controller device of claim 18, wherein:

a first portion of the top base element is configured to move against the first force sensor; and a second portion of the top base element is secured to the first housing such that the first portion bends toward the first housing and with respect to the second portion.

20. The controller device of claim 17, wherein:

each of the first attachment element and the second attachment element comprises a magnet; and each of the first attachment element and the second attachment element comprises an electrical connector.

* * * * *